US012811191B2

(12) United States Patent
Sato et al.

(10) Patent No.: US 12,811,191 B2
(45) Date of Patent: *Nov. 24, 2026

(54) SOLID ELECTROLYTE, METHOD OF PRODUCING SOLID ELECTROLYTE, AND BATTERY

(71) Applicants: NGK INSULATORS, LTD., Nagoya-City (JP); NAGOYA INSTITUTE OF TECHNOLOGY, Nagoya-City (JP)

(72) Inventors: Yosuke Sato, Hashima-Gun (JP); En Yagi, Nagoya-City (JP); Satoshi Ozaki, Obu-City (JP); Toshihiro Yoshida, Nagoya-City (JP); Yuji Katsuda, Tsushima (JP); Mizuki Hirose, Nagoya-City (JP); Reona Miyazaki, Nagoya-City (JP)

(73) Assignees: NGK INSULATORS, LTD., Nagoya-City (JP); NAGOYA INSTITUTE OF TECHNOLOGY, Nagoya-City (JP)

( * ) Notice: Subject to any disclaimer, the term of this patent is extended or adjusted under 35 U.S.C. 154(b) by 584 days.

This patent is subject to a terminal disclaimer.

(21) Appl. No.: 18/461,757

(22) Filed: Sep. 6, 2023

(65) Prior Publication Data

US 2023/0420734 A1 Dec. 28, 2023

Related U.S. Application Data

(63) Continuation of application No. PCT/JP2022/014852, filed on Mar. 28, 2022.

(30) Foreign Application Priority Data

Mar. 30, 2021 (JP) ................................ 2021-057224

(51) Int. Cl.
*H01M 10/0562* (2010.01)

(52) U.S. Cl.
CPC .................. *H01M 10/0562* (2013.01); *H01M 2300/0068* (2013.01)

(58) Field of Classification Search
CPC ..... H01M 10/0562; H01M 2300/0071; H01M 2300/008
See application file for complete search history.

(56) References Cited

U.S. PATENT DOCUMENTS 6,475,663 B1 11/2002 Möhwald et al.
10,818,967 B2 10/2020 Kaga et al.
(Continued)

FOREIGN PATENT DOCUMENTS

JP H06340446 A * 12/1994
JP 2002-522872 A 7/2002
(Continued)

OTHER PUBLICATIONS

English translation of JP Publication H06340446, Dec. 1994.*
(Continued)

*Primary Examiner* — Brittany L Raymond
(74) *Attorney, Agent, or Firm* — Muncy, Geissler, Olds & Lowe, P.C.

(57) ABSTRACT

A solid electrolyte is composed primarily of a component expressed by a composition formula of $Li_{a+d}M_bX_cA_eO_f$ by using values a to f that are greater than 0, where M is an element serving as a trivalent cation, X is a halogen element, and A is a sulfur element or a phosphorus element, wherein $0.8c \le (a+3b) \le 1.2c$ and $1.6f \le (d+n \times e) \le 2.4f$ are satisfied, where when A is a sulfur element, n is 4 or 6, and when A is a phosphorus element, n is 5.

18 Claims, 4 Drawing Sheets

1

(56) References Cited

U.S. PATENT DOCUMENTS

| | | | |
|---|---|---|---|
| 2014/0255792 | A1 | 9/2014 | Cao et al. |
| 2024/0120524 | A1 | 4/2024 | Ueno et al. |

FOREIGN PATENT DOCUMENTS

| | | | |
|---|---|---|---|
| JP | 2014-532962 | A | 12/2014 |
| JP | 2022-132739 | A | 9/2022 |
| KR | 10-2019-0001798 | A | 1/2019 |
| KR | 10-2126144 | B1 | 6/2020 |

OTHER PUBLICATIONS

English translation of the International Preliminary Report on Patentability (Chapter I) dated Oct. 12, 2023 (Application No. PCT/JP2022/014852).

Japanese Office Action (with English translation) dated Jul. 29, 2024 (Application No. 2023-511229).

R. Miyazaki et al., "Li -Ion Conduction of $Li_3AlF_6$ Mechanically Milled with LiCI," *ECS Electrochemistry Letters*, 2012, vol. 1, No. 6, pp. A87-A89 (3 pages).

Max Feinauer, et al. "Unlocking the Potential of Fluoride-Based Solid Electrolytes for Solid-State Lithium Batteries," *ACS Applied Energy Materials*, 2019, 2, pp. 7196-7203 (8 pages).

International Search Report and Written Opinion (Application No. PCT/JP2022/014852) dated Jun. 14, 2022 (8 pages).

Isard et al., "Analysis of the Lithium Ion Conductivity in Aluminum Metaphosphate Glasses," Solid State Ionics, vol. 21, Aug. 31, 1986 (Aug. 31, 1986), pp. 7-18.

Kulkarni et al., "Electrode Effects in Lithium Conducting Oxyfluorophosphate Glasses," Solid State Ionics, North Holland Publication Company, Amsterdam, vol. 14, No. 4, Dec. 1, 1984 (Dec. 1, 1984), pp. 309-317.

Kulkarni et al., "Quenched Glasses in the System LiF—$Li_2O$-Al $(PO_3)_3$, " Materials Letters, vol. 2, No. 6, Sep. 30, 1984 (Sep. 30, 1984), pp. 534-538.

Smedley et al., "Highly Conducting Li+-rich Inorganic Glasses," Solid State Communications, vol. 27, No. 1, Jul. 31, 1978 (Jul. 31, 1978), pp. 21-23.

Extended European Search Report dated Jul. 15, 2025 (Application No. 22780693.2).

Korean Patent Gazette for corresponding Korean Patent No. 10-2924787 B1 published Feb. 6, 2026.

* cited by examiner

SOLID ELECTROLYTE, METHOD OF PRODUCING SOLID ELECTROLYTE, AND BATTERY

CROSS-REFERENCE TO RELATED APPLICATIONS

The present application is a continuation application of International Application No. PCT/JP2022/14852 filed on Mar. 28, 2022, which claims priority to Japanese Patent Application No. 2021-057224 filed on Mar. 30, 2021. The contents of these applications are incorporated herein by reference in their entirety.

TECHNICAL FIELD

The present invention relates to a solid electrolyte and a battery.

BACKGROUND ART

In recent years, with the development of portable equipment such as personal computers and mobile phones, demand for batteries serving as power sources of such portable equipment is increasing considerably. The batteries used for such purposes conventionally use organic electrolyte solutions that contain electrolytes dissolving in inflammable organic solvents, as media for transporting ions. The batteries containing the organic electrolyte solutions may cause safety concerns.

In order to resolve the concerns, the development of all solid-state batteries using solid electrolytes, instead of organic electrolyte solutions, is advancing to ensure intrinsic safety. Since the solid electrolytes are incombustible materials, it is possible to achieve lithium (Li) ion batteries with a high degree of safety.

Among the solid electrolytes, those like sulfide-based ones that are made of materials that react with moisture and generate hydrogen sulfide gas are widely known. Meanwhile, although oxide-based solid electrolytes that do not generate gas such as hydrogen sulfide is also being developed widely, materials for oxide-based solid electrolytes have lower lithium ion conductivity than materials for sulfide-based solid electrolytes, and thus it is difficult to improve battery output (or draw a large current). In view of this, "$Li^+$-Ion Conduction of $Li_3AlF_6$ Mechanically Milled with LiCl" by R. Miyazaki and H. Maekawa, ECS Electrochemistry Letters, 2012, the first volume, the sixth issue, pp. A87-A89 (Document 1) discloses development of solid electrolytes having improved lithium ion conductivity through a mechanical milling process conducted on $Li_3AlF_6$ and LiCl.

According to FIG. 1 of Document 1 mentioned above, the solid electrolytes have higher lithium ion conductivity with an increase in temperature, but the lithium ion conductivity decreases significantly at temperatures above 120° C. There is thus demand for solid electrolytes having high lithium ion conductivity and high-temperature stability.

SUMMARY OF THE INVENTION

The present invention is intended for a solid electrolyte, and it is an object of the present invention to provide a solid electrolyte having high lithium ion conductivity and high-temperature stability.

A solid electrolyte according to a preferable embodiment of the present invention is composed primarily of a component expressed by a composition formula of $Li_{a+d}M_bX_cA_eO_f$ by using values a to f that are greater than 0, where M is an element serving as a trivalent cation, X is a halogen element, and A is a sulfur element or a phosphorus element, wherein $0.8c \leq (a+3b) \leq 1.2c$ and $1.6f \leq (d+n \times e) \leq 2.4f$ are satisfied, where when A is a sulfur element, n is 4 or 6, and when A is a phosphorus element, n is 5.

According to the present invention, it is possible to provide a solid electrolyte having high lithium ion conductivity and high-temperature stability.

Preferably, $0<e/(c+e) \leq 0.5$ is satisfied in the composition formula.

Preferably, $0.1a \leq 3b \leq 10a$ is satisfied in the composition formula.

Preferably, in the composition formula, $0.8d \leq 2e \leq 1.2d$ is satisfied when A is a sulfur element, and $0.8d \leq e \leq 1.2d$ is satisfied when A is a phosphorus element.

Preferably, in the composition formula, A is a sulfur element and n is 6. Preferably, in the composition formula, M is an aluminum element and X is a fluorine element.

Preferably, in measurement conducted on the solid electrolyte by an X-ray diffractometer using a CuKα ray, a half-value width of a peak detected within a range of 2θ from 20° to 25° is greater than or equal to 0.4°.

The present invention is also intended for a method of producing a solid electrolyte. The method of producing a solid electrolyte according to a preferable embodiment of the present invention includes a) preparing a compound expressed by a composition formula of $Li_aM_bX_c$ and a compound expressed by a composition formula of $Li_dA_eO_f$ by using values a to f that are greater than 0, where M is an element serving as a trivalent cation, X is a halogen element, A is a sulfur element or a phosphorus element, the values a to f satisfy $0.8c \leq (a+3b) \leq 1.2c$ and $1.6f \leq (d+n \times e) \leq 2.4f$, and when A is a sulfur element, n is 4 or 6, and when A is a phosphorus element, n is 5, and b) subjecting $Li_aM_bX_c$ and $Li_dA_eO_f$ to a mechanical milling process. In the operation b), a ratio of the amount of substance of $Li_dA_eO_f$ to a total of the amount of substance of $Li_aM_bX_c$ and the amount of substance of $Li_dA_eO_f$ is lower than or equal to 85%.

The method of producing a solid electrolyte according to another preferable embodiment of the present invention includes a) preparing a first compound that is LiX, a second compound that is $MX_3$, and a third compound composed of Li, A, and O, where X is a halogen element, M is an element serving as a trivalent cation, and A is a sulfur element or a phosphorus element, and b) subjecting the first compound, the second compound, and the third compound to a mechanical milling process. In the operation a), $0.8c \leq (a+3b) \leq 1.2c$ and $1.6f \leq (d+n \times e) \leq 2.4f$ are satisfied when a ratio of the amounts of substance of Li, M, and X in a mixture of the first compound and the second compound and the amounts of substance of Li, A, and O in the third compound is expressed as a:b:c:d:e:f by using values a to f that are greater than 0, where when A is a sulfur element, n is 4 or 6, and when A is a phosphorus element, n is 5, and $0<e/(c+e) \leq 0.5$ is further satisfied.

The present invention is also intended for a battery. The battery according to a preferable embodiment of the present invention includes a positive electrode, a negative electrode, and an electrolyte layer provided between the positive electrode and the negative electrode. At least one of the positive electrode, the negative electrode, or the electrolyte layer contains the solid electrolyte described above.

These and other objects, features, aspects and advantages of the present invention will become more apparent from the following detailed description of the present invention when taken in conjunction with the accompanying drawings.

DETAILED DESCRIPTION

Figure 1:
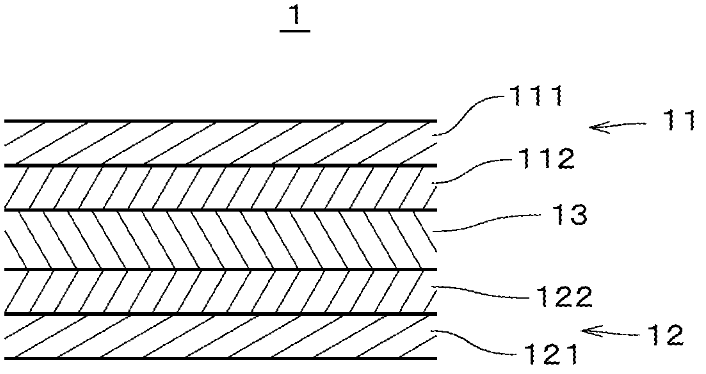
FIG. 1 is a longitudinal section view of an all solid-state secondary battery.

FIG. 1 is a longitudinal section view showing an all solid-state lithium-ion secondary battery 1 (hereinafter, simply referred to as the "all solid-state secondary battery 1"). The all solid-state secondary battery 1 includes a positive electrode 11, a solid electrolyte layer 13, and a negative electrode 12 in the order from above in FIG. 1. That is, the solid electrolyte layer 13 is positioned between the positive electrode 11 and the negative electrode 12. The solid electrolyte layer 13 serves also as a separator layer. The positive electrode 11 includes a current collector 111 and a positive electrode layer 112. The positive electrode layer 112 includes a positive active material. The negative electrode 12 includes a current collector 121 and a negative electrode layer 122. The negative electrode layer 122 includes a negative active material.

The positive active material of the positive electrode layer 112 may preferably contain a lithium complex oxide. A preferable positive active material may be a lithium complex oxide having a layered rock-salt structure and may, for example, be NCM (Li(Ni, Co, Mn)$O_2$). The positive active material may also be any other lithium complex oxide and may, for example, be NCA (Li(Ni, Co, Al)$O_2$) or LCO ($LiCoO_2$) having a layered rock-salt structure, LNMO ($LiNi_{0.5}Mn_{1.5}O_4$) having a spinel structure, or LFP ($LiFePO_4$) having an olivine structure. In addition to the positive active material, the positive electrode layer 112 further includes a solid electrolyte, which will be described later, and an electron conductive agent (e.g., carbon black). The positive electrode layer 112 according to the present embodiment is obtained by integrating these substances by pressurization or heating.

Examples of the negative active material of the negative electrode layer 122 include compounds such as LTO ($Li_4Ti_5O_{12}$), NTO ($Nb_2TiO_7$), titanium oxide ($TiO_2$), graphite, and silicon monoxide (SiO). In addition to the negative active material, the negative electrode layer 122 includes a solid electrolyte, which will be described later. The negative electrode layer 122 may further include an electron conductive agent (e.g., carbon black). The negative electrode layer 122 according to the present embodiment is obtained by integrating these substances by pressurization or heating.

The configurations and materials of the positive electrode 11 and the negative electrode 12 of the all solid-state secondary battery 1 are not limited to the examples described above, and may be any of various configurations and materials.

The solid electrolyte layer 13 may be a solid electrolyte according to the present invention (hereinafter, also referred to as the "present solid electrolyte"), or may include the present solid electrolyte. The present solid electrolyte is a lithium (Li) ion conductive material. For example, the present solid electrolyte may be a mixture (or synthetic substance) of an $Li_3MX_6$ compound that is composed of a lithium element (Li), an element (M) serving as a trivalent cation, and a halogen element (X), and inorganic salt that contains a lithium element and a sulfur (S) or phosphorus (P) element. As will be described later, the present solid electrolyte is expressed by a composition formula of $Li_{a+d}M_bX_cA_eO_f$ by using values a to f that are greater than 0, where M is an element serving as a trivalent cation, X is a halogen element, and A is a sulfur element or a phosphorus element, in which $0.8c \leq (a+3b) \leq 1.2c$ and $1.6f \leq (d+n \times e) \leq 2.4f$ are satisfied, where when A is a sulfur element, n is 4 or 6, and when A is a phosphorus element, n is 5. Preferably, it is also satisfied that, in measurement conducted by an X-ray diffractometer using a CuKα ray, the half-value width of a peak detected within the range of 2θ from 20° to 25° is greater than or equal to 0.4°. The present solid electrolyte has high lithium ion conductivity and high-temperature stability. Besides, the present solid electrolyte is incombustible and chemically stable and does not generate hydrogen sulfide gas. Thus, it is possible to provide the all solid-state secondary battery 1 with intrinsic safety.

A preferable example of the present solid electrolyte may be a mixture of $Li_3AlF_6$ (hereinafter, also referred to as "LAF") composed of a lithium element, an aluminum element, and a fluorine element, and either lithium sulfate ($Li_2SO_4$) (hereinafter, also referred to as "LPO") or lithium metaphosphate ($LiPO_3$) (hereinafter, also referred to as "LSO") that is inorganic salt containing a lithium element and a sulfur or phosphorus element. The present solid electrolyte containing LAF and either LSO or LPO has higher lithium ion conductivity than a simple substance of LAF. The reason for this is not clear, but one conceivable reason is that an interface layer having high lithium ion conductivity is formed at the interface of particles between LAF and LSO or LPO by the mechanical milling process.

Document 1 above, i.e., "$Li^+$-Ion Conduction of $Li_3AlF_6$ Mechanically Milled with LiCl," by R. Miyazaki and H. Maekawa (ECS Electrochemistry Letters, 2012, the first volume, the sixth issue, pp. A87-A89), discloses the solid electrolyte obtained by subjecting LAF and LiCl to a mechanical milling process. As shown in FIG. 1 of Document 1 above, the solid electrolyte has higher lithium ion conductivity than a single substance of LAF. Besides, the lithium ion conductivity increases with an increase in temperature. However, the lithium ion conductivity decreases significantly at temperatures above 120° C. The reason for this is not clear, but one conceivable reason is that crystallization of LiCl progresses in the range of temperatures above 120° C. As a result, it becomes difficult to stably ensure lithium ion conductivity of higher than or equal to $1.0 \times 10^{-4}$ S/cm (siemens per centimeter) at high temperatures.

In contrast to this, the present solid electrolyte maintains high lithium ion conductivity even in the range of temperatures higher than 120° C. and, for example, at 150° C. That is, the present solid electrolyte achieves high-temperature stability. The reason for this is not always clear, but one conceivable reason is that, since the inorganic salt used in the production of the present solid electrolyte contains a sulfur or phosphorus element, the progress of crystallization of the inorganic salt is hindered within the range of temperatures above 120° C. The inorganic salt may preferably be LSO ($Li_2SO_4$) or LPO ($LiPO_3$). This hinders the progress of crystallization of the inorganic salt within the range of temperatures above 120° C. and more reliably allows the solid electrolyte to maintain high lithium ion conductivity.

Figure 2:
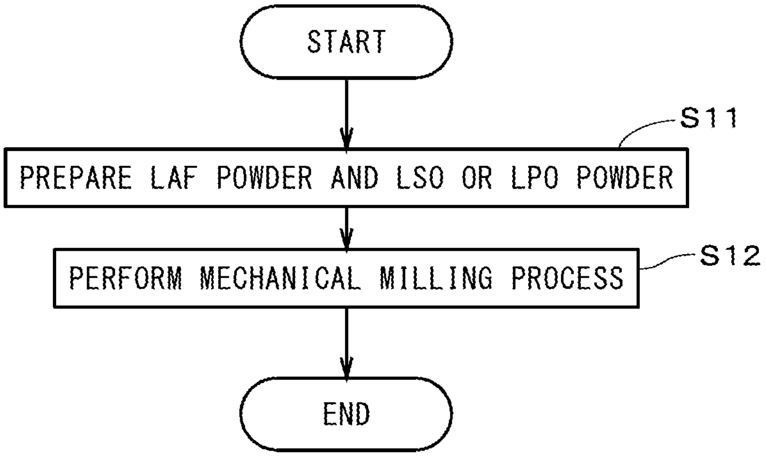
FIG. 2 is a flowchart of processing for producing a solid electrolyte.

FIG. 2 is a flowchart of processing for producing the present solid electrolyte. The following description is given of the processing for producing the present solid electrolyte by mixing LAF and LSO. The same also applies to the case of producing the present solid electrolyte by mixing LAF and LPO. First, LAF powder and LSO powder are prepared (step S11). In the preparation of the LAF powder, for example, commercial lithium fluoride (LiF) powder and commercial aluminum fluoride ($AlF_3$) powder are weighed and mixed together. Then, the resultant mixture is subjected to heat treatment (for example, at 900° C.) and is thereafter pulverized into small particles to obtain LAF powder. The LAF powder may be generated by any other method. The LSO powder is commercially available (the same applies to the LPO powder). It goes without saying that the LSO powder may be generated by a known method (the same applies to the LPO powder). Step S11 is the step of preparing $Li_aM_bX_c$ and $Li_dA_eO_f$, which will be described later.

Then, the LAF powder and the LSO powder are mixed and thereafter subjected to a mechanical milling process (step S12). In one example of the mechanical milling process, a planetary ball mill may be used. The planetary ball mill is capable of generating very high impact energy because a stage with a pot placed thereon revolves while the pot rotates on its axis. The mechanical milling process may use any other type of pulverizer. Through the mechanical milling process described above, powder of the present solid electrolyte is obtained for use in the positive electrode layer 112, the negative electrode layer 122, or the solid electrolyte layer 13. In the present example of processing, the mechanical milling process is conducted at ordinary temperatures, but conditions therefor such as temperature may be appropriately changed. Step S12 is a step of subjecting $Li_aM_bX_c$ and $Li_dA_eO_f$ to the mechanical milling process.

In step S12, it is preferable that the ratio of the amount of substance of LSO to the total of the amount of substance of LAF and the amount of substance of LSO is higher than 0% and lower than or equal to 85%. In this case, it is possible to more reliably make the lithium ion conductivity of the present solid electrolyte higher than the lithium ion conductivity of a single substance of LAF at both ambient and high temperatures (e.g., at 150° C.). As will be shown in experiments described later, the present solid electrolyte containing LAF and LSO has lithium ion conductivity of higher than or equal to $1.0\times10^{-4}$ S/cm at 150° C. when the ratio of the amount of substance of LSO is in the range of 5% to 85%. In order to further increase the lithium ion conductivity of the present solid electrolyte, it is preferable that the ratio of the amount of substance of LSO is in the range of 20% to 70%. The same applies to the case of using LPO, instead of LSO.

Figure 3:
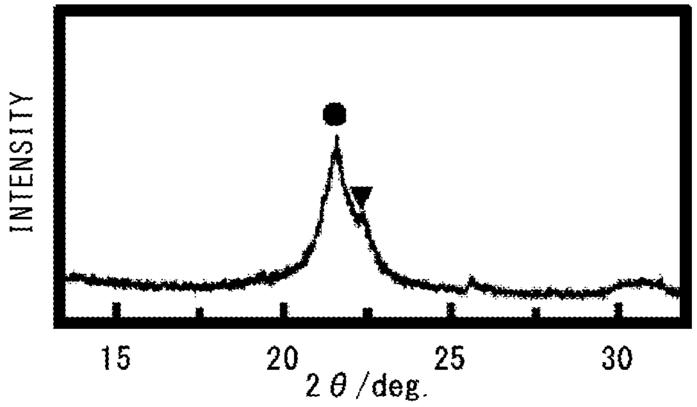
FIG. 3 shows an X-ray diffraction pattern obtained from the solid electrolyte.

FIG. 3 shows an X-ray diffraction (XRD) pattern obtained by measurement conducted on the present solid electrolyte by a powder X-ray diffraction method. The XRD pattern in FIG. 3 is obtained from a solid electrolyte that is produced by a mechanical milling process on condition that the ratio of the amount of substance of LSO is 30% (Experiment 4 described later). The measurement uses a CuKα ray as a radiation source of the X-ray diffractometer. In FIG. 3, a peak derived from LAF is indicated by the black circle, and a peak derived from LSO is indicated by the black triangle (the triangle turned upside down). The peak derived from LAF refers to a peak existing within the range of 2θ of 21.5°±1.0°, and the peak derived from LSO refers to a peak existing within the range of 2θ of 22.5°±1.0°. As shown in FIG. 3, in the case of the solid electrolyte produced by the mechanical milling process, the peak derived from LAF and the peak derived from LSO are both broad (the same applies to the case of a solid electrolyte that contains LAF and LPO). The reason for this may, for example, be considered because very high impact energy generated by the mechanical milling process pulverizes LAF and LSO particles into smaller ones or partly converts these particles to an amorphous state, or because crystal structures become disarranged due to distortion or dislocation in crystals. Since such phenomena remarkably occur in particular at the interface of the particles, the present solid electrolyte is considered to have higher lithium ion conductivity. Therefore, in order to increase the lithium ion conductivity of the present solid electrolyte, it is preferable that the half-value width of the peak derived from LAF or the peak derived from LSO detected within the range of 2θ from 20° to 25° is greater than or equal to 0.4° (the same applies to the solid electrolyte that contains LAF and LPO). There are no particular limitations on the upper limit for the half-value width, and the upper limit may, for example, be 3.0°. Note that the present solid electrolyte may be converted to an amorphous state.

Next, experiments on the solid electrolyte will be described. The experiments described below were conducted in a dry room or in a glove box with a dew point of less than or equal to −40° C.

Experiment 1

Commercial lithium fluoride (LiF) powder and commercial aluminum fluoride ($AlF_3$) powder were prepared as raw materials. These raw materials were weighed and mixed so that the ratio of LiF and $AlF_3$ (the ratio of the amounts of substance) became 3:1. A resultant mixture was subjected to heat treatment at 900° C. and thereafter pulverized into small particles to obtain $Li_3AlF_6$ (i.e., LAF) powder. In this way, solid electrolyte powder that contains only the LAF powder was obtained.

Experiment 2

In addition to the LAF powder described above, commercial $Li_2SO_4$ (i.e., LSO) powder was prepared. These raw materials were weighed so that the ratio of LAF and LSO (the ratio of the amounts of substance) became 90:10, and were subjected to a mechanical milling process using a planetary ball mill to obtain solid electrolyte powder that contains LAF and LSO.

Experiment 3

Solid electrolyte powder was obtained by performing the same processing as in Experiment 2, except that the ratio of LAF and LSO ratio became 80:20 (the ratio of the amounts of substance).

Experiment 4

Solid electrolyte powder was obtained by performing the same processing as in Experiment 2, except that the ratio of LAF and LSO (the ratio of the amounts of substance) became 70:30.

Experiment 5

Solid electrolyte powder was obtained by performing the same processing as in Experiment 2, except that the ratio of LAF and LSO (the ratio of the amounts of substance) became 50:50.

Experiment 6

Solid electrolyte powder was obtained by performing the same processing as in Experiment 2, except that the ratio of LAF and LSO (the ratio of the amounts of substance) became 20:80.

Experiment 7

In addition to the LAF powder described above, commercial $LiPO_3$ (i.e., LPO) powder was prepared. These raw materials were weighed so that the ratio of LAF and LPO ratio (the ratio of the amounts of substance) became 70:30, and were subjected to a mechanical milling process using a planetary ball mill to obtain solid electrolyte powder that contains LAF and LPO.

Measurement of Lithium Ion Conductivity

The solid electrolyte powder was introduced into a mold that includes a sleeve made of resin and upper and lower punches made of stainless steel (SUS), and was subjected to uniaxial press molding by pressurization at 150 MPa. The upper and lower punches were connected to conductors, and lithium ion conductivity was calculated by impedance measurement conducted at temperatures ranging from ambient temperature to 150° C.

X-ray Powder Diffraction Measurement

The solid electrolyte powder was analyzed by an X-ray diffractometer (XRD) using a CuKα ray to obtain an X-ray diffraction pattern. The obtained X-ray diffraction pattern was fitted with a pseudo-Voigt peak function (Type 1) using data analysis software, Origin Pro 2020b, to calculate the half-value width of a peak.

Figure 4:
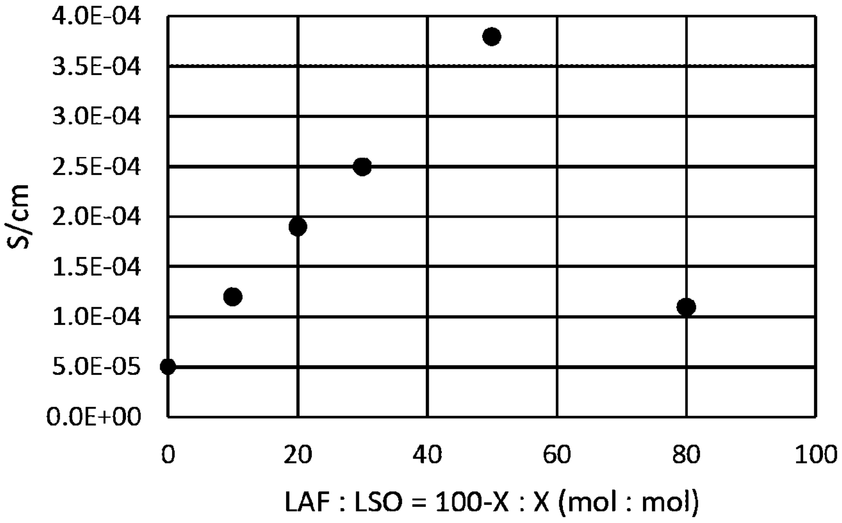
FIG. 4 shows a relationship between lithium ion conductivity and the ratio of the amount of substance of LSO ($Li_2SO_4$).

Table 1 shows the compositions of the solid electrolytes, the lithium ion conductivities of the solid electrolytes at 150° C., and some of the half-value widths of peaks of maximum intensities within the range of 20° to 25° obtained by X-ray diffractometry according to Experiments 1 to 7. In Table 1, Experiments 2 to 7 correspond to examples according to the present invention, and Experiment 1 corresponds to a comparative example. FIG. 4 shows a relationship between the lithium ion conductivity at 150° C. and the ratio (%) of the amount of substance of LSO to the total of the amount of substance of LAF and the amount of substance of LSO.

TABLE 1

| | Composition | | | Half-Value |
|---|---|---|---|---|
| — | Second Component — | Ratio of Amount of Substances LAF:Second Component mol:mol | Conductivity 150° C. S/cm | Width Peak of Maximum Intensity from 20° to 25° ° |
| Experiment 1 | — | 100:0 | 5.0E−05 | |
| Experiment 2 | $Li_2SO_4$ | 90:10 | 1.2E−04 | 0.77 |
| Experiment 3 | $Li_2SO_4$ | 80:20 | 1.9E−04 | 1.16 |
| Experiment 4 | $Li_2SO_4$ | 70:30 | 2.5E−04 | 1.12 |
| Experiment 5 | $Li_2SO_4$ | 50:50 | 3.8E−04 | 1.67 |
| Experiment 6 | $Li_2SO_4$ | 20:80 | 1.1E−04 | |
| Experiment 7 | $LiPO_3$ | 70:30 | 1.0E−04 | |

The solid electrolyte powder containing LSO according to each of Experiments 2 to 6 and the solid electrolyte powder containing LPO according to Experiment 7 had higher lithium ion conductivity at 150° C. than the solid electrolyte powder containing neither LSO nor LPO according to Experiment 1. To be more specific, the lithium ion conductivity at 150° C. increased with an increase in the ratio of the amount of substance of LSO within a range in which the ratio of the amount of substance of LSO to the total of the amount of substance of LAF and the amount of substance of LSO was relatively low (e.g., within the range of 50% or less). The lithium ion conductivity decreased when the ratio of the amount of substance of LSO became excessively high. However, even in Experiment 6 in which the ratio of the amount of substance of LSO was 80%, the lithium ion conductivity was $1.1\times10^{-4}$ S/cm. Thus, it is conceivable that, if the ratio of the amount of substance of LSO is higher than 0% and lower than or equal to 85%, it is possible to ensure higher lithium ion conductivity than the solid electrolyte powder according to Experiment 1.

According to Experiment 2 in which the ratio of the amount of substance of LSO was 10%, the lithium ion conductivity at 150° C. was $1.2\times10^{-4}$ S/cm. Thus, it is conceivable that, if the ratio of the amount of substance of LSO is in the range of 5% to 85% (i.e., the molar ratio of LAF and LSO is in the range of 95:5 to 15:85, it is possible to ensure the lithium ion conductivity of approximately $1.0\times10^{-4}$ S/cm or higher. In order to further increase the lithium ion conductivity (e.g., to approximately $2.0\times10^{-4}$ S/cm or higher), it is preferable that the ratio of the amount of substance of LSO is in the range of 20% to 70%. According to Experiments 2 to 6 and Experiment 7, the solid electrolyte powder maintained lithium ion conductivity of higher than or equal to $1.0\times10^{-4}$ S/cm even after retained at 150° C. for some time. In this way, the solid electrolyte powder according to the examples of the present invention has high-temperature stability.

According to Experiments 2 to 5, the solid electrolyte powder exhibited an XRD pattern with a very broad peak, in which the half-value width of a peak of maximum intensity detected within the range of 20° to 25° was in the range of 0.77° to 1.67°.

Preparation of All Solid-State Battery

Positive active material powder that was NCM, solid electrolyte powder, and electron conductive agent powder were weighed and mixed to obtain ready mixed powder of a positive electrode. Also, negative active material powder that was graphite, solid electrolyte powder, and electron conductive agent powder were weighed and mixed to obtain ready mixed powder of a negative electrode. The solid electrolyte powder was introduced into a mold including a sleeve made of resin and upper and lower punches made of SUS, and was subjected to uniaxial press molding by pressurization at 150 MPa. The ready mixed powder of the positive electrode was introduced on the pressed solid electrolyte powder and integrated together by pressurization at 150 MPa. The ready mixed powder of the negative electrode was introduced on the opposite side of the pressed solid electrolyte powder to the positive electrode and integrated together by pressurization at 150 MPa. In this way, a battery that included a positive electrode layer, a solid electrolyte layer, and a negative electrode layer was prepared.

Charge/Discharge Test

The battery described above was placed stationary in a constant-temperature bath kept at 150° C. in order to conduct a charge/discharge test. Charge referred to constant-current charge with a current density of 0.4 mA/cm$^2$ and a cut-off voltage of 4.15V, and discharge referred to constant-current discharge with a current density of 0.4 mA/cm$^2$ and a cut-off voltage of 2.0V. A battery using the solid electrolyte powder according to Experiment 1 (comparative example) had a discharge capacity of less than 10 mAh/g-NCM (less than 6% of a theoretical capacity). A battery using the solid electrolyte powder according to Experiment 5 (example according to the present invention) had a discharge capacity of 47 mAh/g-NCM (approximately 30% of the theoretical capacity), which was approximately five times of that in the comparative example.

Although, in the present embodiment described above, the present solid electrolyte is obtained by subjecting $Li_3AlF_6$ and the inorganic salt, which is either $Li_2SO_4$ or $LiPO_3$, to a mechanical milling process, the present solid electrolyte may be produced by mixing a compound that contains a lithium element (Li), an element (M) serving as a trivalent cation, and a halogen element (X) with arbitrary inorganic salt that contains a lithium element and a sulfur or phosphorus element. In this case, the compound described above can be expressed by a composition formula of $Li_aM_bX_c$, where M is an aluminum (Al) element or a different element serving as a trivalent cation (typically, a metallic element), X is a fluorine (F) element or a different halogen element, and a to c are values greater than 0. Here, Li, M, and X are respectively a univalent cation, a trivalent cation, and a univalent anion, and the compound described above is expressed by $Li_3MX_6$. In the composition formula of $Li_3MX_6$, a+3b=c and a=3b are satisfied. Other examples of the compound described above include, besides $Li_3AlF_6$, $Li_3YF_6$, $Li_3LaF_6$, $Li_3GaF_6$, $Li_3YCl_6$, $Li_3YBr_6$, $Li_3InCl_6$, and $Li_3LaI_6$.

Similarly, the inorganic salt described above can be expressed by a composition formula of $Li_dA_eO_f$, where A is a sulfur or phosphorus element, and d to f are values greater than 0. When A is a sulfur element, Li, A, and O are respectively an univalent cation, a tetravalent or hexavalent cation, and a bivalent anion, and therefore d+4e=2f and d+6e=2f need to be satisfied. When A is a phosphorus element, Li, A, and O are respectively a univalent cation, a pentad cation, and a bivalent anion, and therefore d+5e=2f needs to be satisfied. In other words, d+n×e=2f needs to be satisfied, where when A is a sulfur element, n is 4 or 6, and when A is a phosphorus element, n is 5. Other examples of the inorganic salt described above include, besides $Li_2SO_4$ or $LiPO_3$, lithium sulfite ($Li_2SO_3$) and lithium orthophosphate ($Li_3PO_4$).

As described above, when the compound containing a lithium element (Li), an element (M) serving as a trivalent cation, and a halogen element (X) is expressed by $Li_aM_bX_c$ and the inorganic salt containing a lithium element and a sulfur or phosphorus element is expressed by $Li_dA_eO_f$, by using the values a to f that are greater than 0, the present solid electrolyte obtained by mixing the compound and the inorganic salt is expressed by a composition formula of $Li_{a+d}M_bX_cA_eO_f$. Moreover, the conditions previously described, i.e., a+3b=c, a=3b, and d+n×e=2f, need to be satisfied, where when A is a sulfur element, n is 4 or 6, and when A is a phosphorus element, n is 5. With consideration given to factors such as errors of measurement, 0.8c≤(a+3b)≤1.2c, 0.8a≤3b≤1.2a, and 1.6f≤(d+n×e)≤2.4f may be satisfied. Preferably, 0.9c≤(a+3b)≤1.1c, 0.9a≤3b≤1.1a, and 1.8f≤(d+n×e)≤2.2f may be satisfied. Accordingly, the present solid electrolyte expressed by the composition formula of $Li_{a+d}M_bX_cA_eO_f$ has high lithium ion conductivity and high-temperature stability. As will be described later, in the case where the compound expressed by $Li_aM_bX_c$ is not generated, there is no need to satisfy 0.8a≤3b≤1.2a.

As described previously, it is possible to more reliably make the lithium ion conductivity of the present solid electrolyte higher than that of the single substance of LAF if the ratio of the amount of substance of LSO to the total of the amount of substance of LAF and the amount of substance of LSO is lower than or equal to 85%. This relationship is considered to also apply to any solid electrolyte that is generated from an arbitrary compound and arbitrary inorganic salt and expressed by a composition formula of $Li_{a+d}M_bX_cA_eO_f$. When the ratio of the amount of substance of the aforementioned inorganic salt (e.g., LSO) is 85%, e/(c+e) becomes 0.49 in the composition formula of $Li_{a+d}M_bX_cA_eO_f$ described above. Therefore, if the composition formula of $Li_{a+d}M_bX_cA_eO_f$ satisfies 0<e/(c+e)≤0.5, it is possible to more reliably make the lithium ion conductivity of the present solid electrolyte higher than that of a simple substance of $Li_aM_bX_c$. As described previously, a to f are values greater than 0, and the solid electrolyte contains $Li_dA_eO_f$.

In order to further increase the lithium ion conductivity by setting the ratio of the amount of substance of the aforementioned inorganic salt in the range of 5% to 85%, it is preferable that the composition formula of $Li_{a+d}M_bX_cA_eO_f$ satisfies 0.01≤e/(c+e)≤0.5. In order to yet further increase the lithium ion conductivity by setting the ratio of the amount of substance of the aforementioned inorganic salt in the range of 20 to 70%, it is preferable that the composition formula of $Li_{a+d}M_bX_cA_eO_f$ satisfies 0.04≤e/(c+e)≤0.28.

Preferably, $Li_dA_eO_f$ may be $Li_2SO_4$ or $LiPO_3$ (i.e., LSO or LPO). In this case, it is possible to more reliably maintain high lithium ion conductivity at high temperatures. When $Li_dA_eO_f$ is LSO, A is a sulfur element, and d=2e is satisfied in the composition formula of $Li_{a+d}M_bX_cA_eO_f$. With consideration given to factors such as errors of measurement, 0.8d≤2e≤1.2d may be satisfied, and preferably 0.9d≤2e≤1.1d may be satisfied. When $Li_dA_eO_f$ is LPO, A is a phosphorus element, and d=e is satisfied in the composition formula of $Li_{a+d}M_bX_cA_eO_f$. With consideration given to factors such as errors of measurement, 0.8d≤e≤1.2d may be satisfied, and preferably 0.9d≤e≤1.1d may be satisfied. Also, $Li_aM_bX_c$ may preferably be $Li_3AlF_6$ (i.e., LAF). In other words, in the composition formula of $Li_{a+d}M_bX_cA_eO_f$, M is an aluminum element and X is a fluorine element. In this case, it is possible to more reliably achieve high lithium ion conductivity.

As described previously, the composition formula of the present solid electrolyte is expressed as $Li_{a+d}M_bX_cA_eO_f$. For example, this composition formula is expressed as $Li_{a+d}Al_bF_cS_eO_f$ in the case of mixing LAF and LSO. This composition formula is also expressed as $Li_{a+d}Al_bF_cP_eO_f$ in the case of mixing LAF and LPO. To identify whether an unknown solid electrolyte is the present solid electrolyte, the unknown solid electrolyte is subjected to chemical analysis to identify whether constituent elements of the unknown solid electrolyte are Li, M, X, A, and O, where M is an element serving as a trivalent cation, X is a halogen element, and A is a sulfur or phosphorus element. When the constituent elements are Li, M, X, A, and O and if the values a to f of the molar ratio of the constituent elements are all greater than 0, and $0.8c \leq (a+3b) \leq 1.2c$ and $1.6f \leq (d+n \times e) \leq 2.4f$ are satisfied, where when A is a sulfur element, n is 4 or 6, and when A is a phosphorus element, n is 5, the unknown solid electrolyte can be said as the present solid electrolyte. When $0 < e/(c+e) \leq 0.5$ is satisfied, it can be said that the ratio of the amount of substance of the aforementioned inorganic salt to the total of the amount of substance of the aforementioned compound (e.g., LAF) and the amount of substance of the aforementioned inorganic salt (e.g., LSO) is lower than or equal to 85%.

For example, Li, Al, S, and P may be quantitated by an ICP emission spectral analyzer, and F may be quantitated by ion chromatography. Oxygen (O) may be quantitated by oxygen/nitrogen gas analysis. When the present solid electrolyte contains an element M other than Al and an element X other than F, measurement methods that are capable of quantitating the elements M and X may be appropriately selected.

The above example of processing describes the case in which, after $Li_3AlF_6$ (i.e., LAF) is generated by mixing LiF and $AlF_3$ so that the ratio of the amounts of substance becomes 3:1, $Li_3AlF_6$ and $Li_2SO_4$ (or $LiPO_3$) are subjected to a mechanical milling process. Alternatively, LiF, $AlF_3$, and $Li_2SO_4$ (or $LiPO_3$) may be subjected to a mechanical milling process without generating $Li_3AlF_6$.

Figure 5:
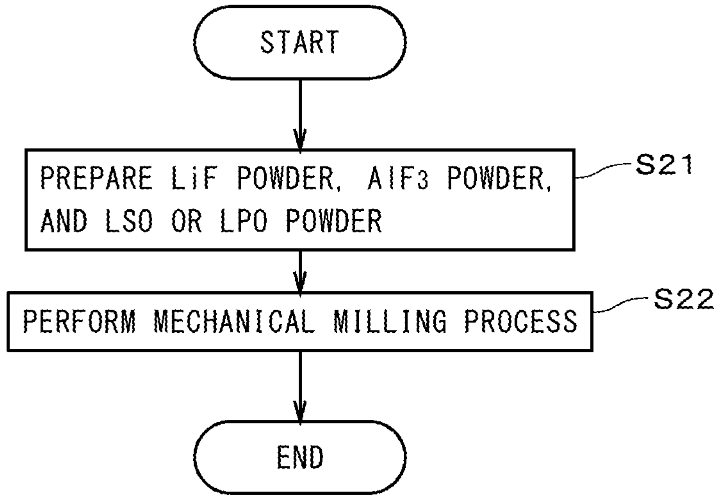
FIG. 5 is a flowchart showing another example of the processing for producing a solid electrolyte.

FIG. 5 is a flowchart showing another example of the processing for producing the present solid electrolyte. In this example of production, LiF powder, $AlF_3$ powder, and $Li_2SO_4$ (or $LiPO_3$) powder are prepared (step S21). Then, the LiF powder, the $AlF_3$ powder, and the $Li_2SO_4$ (or $LiPO_3$) powder are mixed and subjected to a mechanical milling process (step S22).

At this time, the ratio of the amounts of substance of LiF and $AlF_3$ may be other than 3:1. The ratio of the amount of substance of LiF to the total of the amounts of substance of LiF, $AlF_3$, and $Li_2SO_4$ may, for example, be higher than or equal to 10% and lower than or equal to 80% and preferably higher than or equal to 30% and lower than or equal to 70%. The ratio of the amount of substance of $AlF_3$ may, for example, be higher than or equal to 5% and lower than or equal to 60% and preferably higher than or equal to 10% and lower than or equal to 50%. The ratio of the amount of substance of $Li_2SO_4$ may, for example, be higher than or equal to 2% and lower than or equal to 50% and preferably higher than or equal to 10% and lower than or equal to 40%. Through the processing described above, it is possible to obtain powder of the present solid electrolyte that has high lithium ion conductivity and high-temperature stability. The same applies the case of using $LiPO_3$, instead of $Li_2SO_4$.

Here, the ratio of the amounts of substance of Li, Al, and F in a mixture obtained by mixing only LiF and $AlF_3$ prepared in step S21 is expressed as a:b:c, where a to c are values greater than 0. In this case, a+3b=c is satisfied because Li, Al, and F are respectively an univalent cation, a trivalent cation, and an univalent anion. With consideration given to factors such as errors of measurement, $0.8c \leq (a+3b) \leq 1.2c$ is satisfied. Meanwhile, unlike in the case where $Li_3AlF_6$ is generated in advance, the ratio of the amounts of substance of LiF and $AlF_3$ is not limited to 3:1, and therefore a=3b is not always satisfied. In other words, even if $0.8a \leq 3b \leq 1.2a$ is not satisfied, it is possible to obtain the present solid electrolyte that has high lithium ion conductivity and high-temperature stability.

Next, experiments in producing the present solid electrolyte by mixing LiF, $AlF_3$, and $Li_2SO_4$ will be described with reference to Table 2. In Table 2, Experiments 8 to 17 correspond to examples according to the present invention.

TABLE 2

| — | Composition LiF mol % | Composition $AlF_3$ mol % | Composition $Li_2SO_4$ mol % | Conductivity Measurement at 150° C. S/cm |
|---|---|---|---|---|
| Experiment 8 | 60 | 20 | 20 | 4.1E−04 |
| Experiment 9 | 45 | 35 | 20 | 4.3E−04 |
| Experiment 10 | 45 | 20 | 35 | 4.4E−04 |
| Experiment 11 | 75 | 20 | 5 | 1.0E−04 |
| Experiment 12 | 60 | 35 | 5 | 1.2E−04 |
| Experiment 13 | 52.5 | 27.5 | 20 | 4.9E−04 |
| Experiment 14 | 37.5 | 42.5 | 20 | 3.4E−04 |
| Experiment 15 | 45 | 27.5 | 27.5 | 4.6E−04 |
| Experiment 16 | 37.5 | 35 | 27.5 | 4.1E−04 |
| Experiment 17 | 20 | 40 | 40 | 2.8E−04 |

Experiment 8

Commercial LiF powder, commercial $AlF_3$ powder, and commercial $Li_2SO_4$ powder were prepared. These raw materials were weighed so that the ratio of LiF, $AlF_3$, and $Li_2SO_4$ (the ratio of the amounts of substance) became 60:20:20, and were subjected to a mechanical milling process using a planetary ball mill to obtain solid electrolyte powder that contained LiF, $AlF_3$, and $Li_2SO_4$. Thereafter, lithium ion conductivity was measured in the same manner as described above in "Measurement of Lithium Ion Conductivity." According to Experiment 8, lithium ion conductivity at 150° C. was $4.1 \times 10^{-4}$ S/cm and higher than the ion conductivity ($5.0 \times 10^{-5}$ S/cm) according to Experiment 1, which was a comparative example. The ratio of the amounts of substance of LiF, $AlF_3$, and $Li_2SO_4$ according to Experiment 8 was the same as that according to Experiment 5 described previously, and Experiment 8 differed from Experiment 5 in that $Li_3AlF_6$ was not generated in advance.

Experiments 9 to 17

According to Experiments 9 to 17, the solid electrolyte powder was obtained by performing the same processing as in Experiment 8, except that LiF, $AlF_3$, and $Li_2SO_4$ were weighed so that the ratio of the amounts of substance became as shown in Table 2. Thereafter, lithium ion conductivity was measured. According to Experiments 9 to 17, although the ratio of the amounts of substance of LiF and $AlF_3$ was different from 3:1, the lithium ion conductivity at 150° C. was higher than in Experiment 1.

As described above, even if a=3b is not satisfied when the ratio of the amounts of substance of Li, Al, and F in the mixture of LiF and $AlF_3$ is expressed as a:b:c (i.e., the ratio of the amounts of substance of LiF and $AlF_3$ is different from 3:1), it is possible to achieve a solid electrolyte that has high lithium ion conductivity. In actuality, the solid electrolyte powder according to Experiments 8 to 17 maintained high lithium ion conductivity even after retained at 150° C. for some time, and achieved high-temperature stability.

Next, preferable ranges of values such as 3b/a will be described. According to Experiments 8 to 17, the ratio of the amounts of substance of Li, Al, and F in a mixture of LiF and $AlF_3$ and the ratio of the amounts of substance of Li, S, and O in $Li_2SO_4$, among LiF, $AlF_3$, and $Li_2SO_4$ used in the production of the solid electrolyte, were expressed as a:b:c:d:e:f According to Experiments 1 to 6, the ratio of the amounts of substance of Li, Al, and F in $Li_3AlF_6$ and the ratio of the amounts of substance of Li, S, and O in $Li_2SO_4$, which were used in the production of the solid electrolyte, were expressed as a:b:c:d:e:f Here, a to f are values greater than 0.

Figure 6:
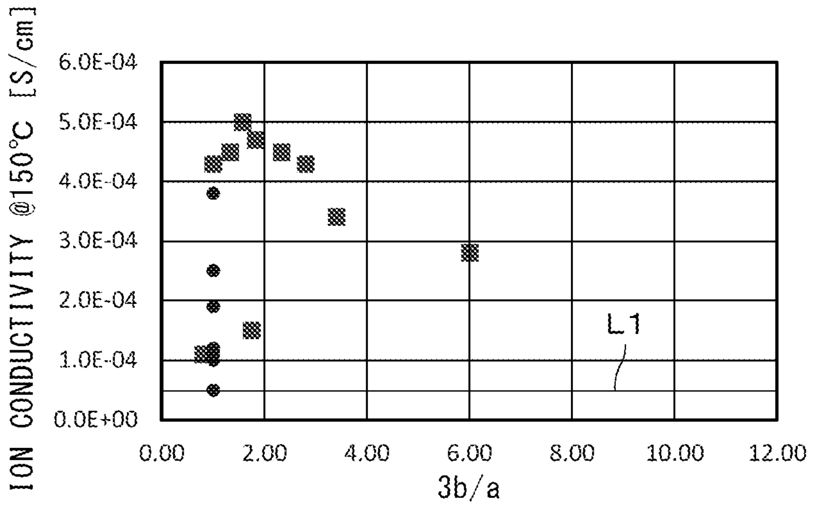
FIG. 6 shows a relationship between the value of 3b/a and lithium ion conductivity.

FIG. 6 shows a relationship between the value of 3b/a and lithium ion conductivity at 150° C. according to Experiments 1 to 6 and 8 to 17. In FIG. 6, the ion conductivity according to each of Experiments 1 to 6 is plotted with a circle, the ion conductivity according to each of Experiments 8 to 17 is plotted with a square, and the ion conductivity according to Experiment 1, which is a comparative example, is indicated by a line L1 (the same applies to FIG. 7 described later). It is clear from FIG. 6 that the present solid electrolyte has high lithium ion conductivity even outside the range of $0.8 \leq 3b/a \leq 1.2$ (i.e., $0.8a \leq 3b \leq 1.2a$). In order to more reliably ensure high lithium ion conductivity of the present solid electrolyte, it is preferable that $0.1 \leq 3b/a \leq 10$ (i.e., $0.1a \leq 3b \leq 10a$) is satisfied. The value of 3b/a may be preferably greater than or equal to 0.5 and more preferably greater than 1.0. The value of 3b/a may be more preferably less than or equal to 8.5 and yet more preferably less than or equal to 6.0.

Figure 7:
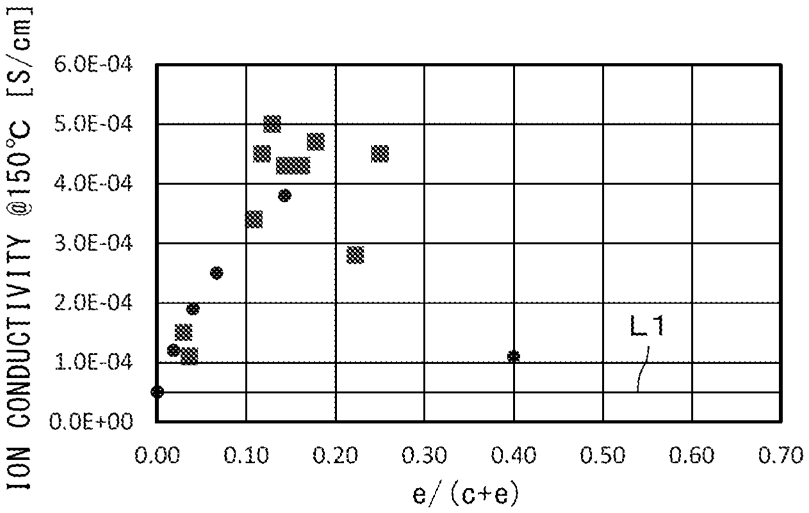
FIG. 7 shows a relationship between the value of e/(c+e) and lithium ion conductivity.

FIG. 7 shows a relationship between the value of e/(c+e) and lithium ion conductivity at 150° C. according to Experiments 1 to 6 and 8 to 17. As described previously, the value of e/(c+e) relates to the mixing ratio of $Li_2SO_4$. It is found from FIG. 7 that when $0 < e/(c+e) \leq 0.5$ is satisfied, high lithium ion conductivity is achieved more reliably. In order to further increase the lithium ion conductivity, it is preferable that $0.04 \leq e/(c+e) \leq 0.28$ is satisfied.

In the production of the solid electrolyte in FIG. 5, the present solid electrolyte is obtained by subjecting LiF, $AlF_3$, and $Li_2SO_4$ to a mechanical milling process as described previously, but the raw materials for the present solid electrolyte are not limited to LiF, $AlF_3$, and $Li_2SO_4$ (or $LiPO_3$). The present solid electrolyte may be produced by mixing a first compound that is LiX, a second compound that is $MX_3$, and a third compound composed of Li, A, and O, where X is an arbitrary halogen element, M is an arbitrary element serving as a trivalent cation, and A is a sulfur or phosphorus element. In this case, the first, second, and third compounds described above are prepared in step S21 in FIG. 5. In step S22, the first, second, and third compounds are subjected to a mechanical milling process to obtain the present solid electrolyte.

When the ratio of the amounts of substance of Li, M, and X in the mixture of the first and second compounds and the amounts of substance of Li, A, and O in the third compound is expressed as a:b:c:d:e:f by using values a to f that are greater than 0, the mixture satisfies $0.8c \leq (a+3b) \leq 1.2c$ as described previously. The third compound satisfies $1.6f \leq (d+n \times e) \leq 2.4f$ as described previously, where when A is a sulfur element, n is 4 or 6, and when A is a phosphorus element, n is 5. Other examples of the first compound of LiX include, besides LiF, LiCl and LiBr. Other examples of the second compound of $MX_3$ include, besides $AlF_3$, $YF_3$, $LaF_3$, and $GaF_3$. Other examples of the third compound of $Li_dA_eO_f$ include, besides $Li_2SO_4$ and $LiPO_3$, lithium sulfite ($Li_2SO_3$) and lithium orthophosphate ($Li_3PO_4$).

In the production of the solid electrolyte shown in FIG. 5, the composition formula is also expressed as $Li_{a+d}M_bX_cA_eO_f$, and it is possible to obtain the present solid electrolyte having high lithium ion conductivity and high-temperature stability. It is also preferable that $0 < e/(c+e) \leq 0.5$ is satisfied. In this case, it is possible to more reliably achieve high lithium ion conductivity. There are no particular limitations on the mixing ratio of the first compound, which is LiX, and the second compound, which is $MX_3$, it is preferable that $0.1a \leq 3b \leq 10a$ is satisfied in order to more reliably achieve high lithium ion conductivity.

The present solid electrolyte, the method of producing the present solid electrolyte, and the battery may be modified in various ways.

The present solid electrolyte may contain impurities and contain a component expressed by the composition formula of $Li_{a+d}M_bX_cA_eO_f$ as its principal component. The principal component refers to a component with a highest mass ratio among the components of the solid electrolyte. The mass ratio of the principal component of the solid electrolyte may be preferably higher than or equal to 80% by mass and more preferably higher than or equal to 90% by mass. The present solid electrolyte may be mixed with other substances (which may include Li) and used as an electrolyte material. The mass ratio of the present solid electrolyte in the electrolyte material may be preferably higher than or equal to 50% by mass, more preferably higher than or equal to 60% by mass, and yet more preferably higher than or equal to 70% by mass.

In the X-ray diffraction pattern obtained from the present solid electrolyte, the half-value width of a peak detected within the range of a diffraction angle 2θ from 20° to 25° may be less than 0.4°.

The solid electrolyte layer 13 may contain substances other than the present solid electrolyte. The present solid electrolyte used in the all solid-state secondary battery 1 does not necessarily have to be contained in all of the positive electrode 11, the negative electrode 12, and the solid electrolyte layer 13, and may be contained in at least one of the positive electrode 11, the negative electrode 12, or the solid electrolyte layer 13. The present solid electrolyte may be used in batteries other than all solid-state secondary batteries, and may be used for purposes other than batteries. The production of the present solid electrolyte may be conducted by a process other than the mechanical milling process.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 all solid-state lithium-ion secondary battery
11 positive electrode 12 negative electrode 13 solid electrolyte layer S11, S12, S21, S22 step

The invention claimed is:

1. A solid electrolyte composed primarily of a component expressed by a composition formula of $Li_{a+d}M_bX_cA_eO_f$ by using values a to f that are greater than 0, where M is an element serving as a trivalent cation, X is a halogen element, and A is a sulfur element or a phosphorus element, wherein $0.8c \leq (a+3b) \leq 1.2c$ and $1.6f \leq (d+n \times e) \leq 2.4f$ are satisfied, where when A is a sulfur element, n is 4 or 6, and when A is a phosphorus element, n is 5.

2. The solid electrolyte according to claim 1, wherein $0<e/(c+e) \leq 0.5$ is satisfied in said composition formula.

3. The solid electrolyte according to claim 1, wherein $0.1a \leq 3b \leq 10a$ is satisfied in said composition formula.

4. The solid electrolyte according to claim 1, wherein in said composition formula, $0.8d \leq 2e \leq 1.2d$ is satisfied when A is a sulfur element, and $0.8d \leq e \leq 1.2d$ is satisfied when A is a phosphorus element.

5. The solid e.lectrolyte according to claim 1, wherein in said composition formula, A is a sulfur element and n is 6.

6. The solid electrolyte according to claim 1, wherein in said composition formula, M is an aluminum element and X is a fluorine element.

7. The solid electrolyte according to claim 1, wherein in measurement conducted by an X-ray diffractometer using a CuKα ray, a half-value width of a peak detected within a range of 2θ from 20° to 25° is greater than or equal to 0.4°.

8. A method of producing a solid electrolyte, comprising:

a) preparing a compound expressed by a composition formula of $Li_aM_bX_c$ and a compound expressed by a composition formula of $Li_dA_eO_f$ by using values a to f that are greater than 0, where M is an element serving as a trivalent cation, X is a halogen element, A is a sulfur element or a phosphorus element, the values a to f satisfy $0.8c \leq (a+3b) \leq 1.2c$ and $1.6f \leq (d+n \times e) \leq 2.4f$, and when A is a sulfur element, n is 4 or 6, and when A is a phosphorus element, n is 5; and b) subjecting $Li_aM_bX_c$ and $Li_dA_eO_f$ to a mechanical milling process, wherein, in said operation b), a ratio of the amount of substance of $Li_dA_eO_f$ to a total of the amount of substance of $Li_aM_bX_c$ and the amount of substance of $Li_dA_eO_f$ is lower than or equal to 85%.

9. The method of producing a solid electrolyte according to claim 8, wherein $0.1a \leq 3b \leq 10a$ is satisfied in said operation a).

10. The method of producing a solid electrolyte according to claim 8, wherein $0.8d \leq 2e \leq 1.2d$ is satisfied when A is a sulfur element, and $0.8d \leq e \leq 1.2d$ is satisfied when A is a phosphorus element.

11. The method of producing a solid electrolyte according to claim 8, wherein

A is a sulfur element, and n is 6.

12. The method of producing a solid electrolyte according to claim 8, wherein

M is an aluminum element, and X is a fluorine element.

13. A method of producing a solid electrolyte, comprising:

a) preparing a first compound that is LiX, a second compound that is $MX_3$, and a third compound composed of Li, A, and O, where X is a halogen element, M is an element serving as a trivalent cation, and A is a sulfur element or a phosphorus element; and b) subjecting a mixture of said first compound, said second compound, and said third compound to a mechanical milling process, wherein, in said operation a), $0.8c \leq (a+3b) \leq 1.2c$ and $1.6f \leq (d+n \times e) \leq 2.4f$ are satisfied when a molar ratio of the amounts of substance of Li, M, and X in a mixture of said first compound and said second compound and the amounts of substance of Li, A, and O in said third compound is expressed as a:b:c:d:e:f, respectively, by using values a to f that are greater than 0, where when A is a sulfur element, n is 4 or 6, and when A is a phosphorus element, n is 5, and $0<e/(c+e) \leq 0.5$ is further satisfied.

14. The method of producing a solid electrolyte according to claim 13, wherein $0.1a \leq 3b \leq 10a$ is satisfied in said operation a).

15. The method of producing a solid electrolyte according to claim 13, wherein $0.8d \leq 2e \leq 1.2d$ is satisfied when A is a sulfur element, and $0.8d \leq e \leq 1.2d$ is satisfied when A is a phosphorus element.

16. The method of producing a solid electrolyte according to claim 13, wherein

A is a sulfur element, and n is 6.

17. The method of producing a solid electrolyte according to claim 13, wherein

M is an aluminum element, and X is a fluorine element.

18. A battery comprising:

a positive electrode;

a negative electrode; and an electrolyte layer provided between said positive electrode and said negative electrode, wherein at least one of said positive electrode, said negative electrode, or said electrolyte layer contains the solid electrolyte according to claim 1.

* * * * *